United States Patent
Ji et al.

(10) Patent No.: US 10,013,085 B2
(45) Date of Patent: Jul. 3, 2018

(54) FULL-IN-CELL TOUCH SCREEN PANEL AND A MOBILE DEVICE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Feilin Ji, Guangdong (CN); Taisheng An, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 267 days.

(21) Appl. No.: 14/893,152

(22) PCT Filed: Oct. 29, 2015

(86) PCT No.: PCT/CN2015/093163
§ 371 (c)(1),
(2) Date: Nov. 23, 2015

(87) PCT Pub. No.: WO2017/045247
PCT Pub. Date: Mar. 23, 2017

(65) Prior Publication Data
US 2017/0255307 A1    Sep. 7, 2017

(30) Foreign Application Priority Data

Sep. 15, 2015  (CN) .......................... 2015 1 0589424

(51) Int. Cl.
*G06F 3/041* (2006.01)
*G02F 1/1362* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
CPC .. G06F 3/0412; G06F 3/0416; G02F 1/13338; G02F 1/136286; G02F 1/134309;
(Continued)

(56) References Cited

U.S. PATENT DOCUMENTS 8,922,537 B2 * 12/2014 Koyama .............. G09G 3/3696
345/174
2015/0153858 A1 * 6/2015 Kim ...................... G06F 3/0412
345/173
2017/0269746 A1 * 9/2017 He ........................ G06F 3/0412

* cited by examiner

*Primary Examiner* — Kumar Patel
*Assistant Examiner* — Amy C Onyekaba
(74) *Attorney, Agent, or Firm* — Andrew C. Cheng

(57) ABSTRACT

The invention disclosure a full-in-cell touch screen panel and a mobile device including a plurality of the sensor pads arranged in a matrix, a plurality of data lines arranged along the row direction of the matrix, a data driving device connected to the data lines and a plurality of transistors formed on the data line, wherein each transistor of the plurality of the transistors is formed in each of the data line, the drain electrode of each transistor is connected to the corresponding data line, the gate electrodes of all of the plurality of the transistors are all connected to the specific enable terminal of the data driving device. According to the full-in-cell touch screen panel and its display apparatus, the electric charge coupled to the liquid crystal in the touch scanning period can be released.

6 Claims, 3 Drawing Sheets

(51) Int. Cl.
*G02F 1/1368* (2006.01)
*G02F 1/1343* (2006.01)
*G02F 1/1333* (2006.01)
*G02F 1/1335* (2006.01)

(52) U.S. Cl.
CPC .. *G02F 1/134309* (2013.01); *G02F 1/136286* (2013.01); *G06F 3/0416* (2013.01); *G02F 1/133514* (2013.01); *G02F 2201/121* (2013.01)

(58) Field of Classification Search
CPC ............. G02F 1/1368; G02F 2201/121; G02F 1/133514
See application file for complete search history.

FULL-IN-CELL TOUCH SCREEN PANEL AND A MOBILE DEVICE

BACKGROUND OF THE INVENTION

Field of the Invention

The present invention relates to the field of full in cell touch screen panel technology, and in particular to a full in cell touch screen panel and a mobile device with the full-in-cell touch screen panel.

Discussion of the Related Art

By the rapid development of the liquid crystal display technology, the touch screen panel is gradually extending to people's life, wherein since the in cell touch screen panel have the advantage of making the panel more thin and compact, the in cell touch screen panel have been adopted by the end device company and become the future developing trend.

The touch screen panel is forming a touch circuit embedded in the display panel to achieve the integration of the touch screen panel and the display panel. Nowadays, in the framework of the full-in-cell touch screen panel, the touch sensor is usually formed in one side of the thin-film transistor (TFT), as illustrated in FIG. 1. Here, the in cell touch screen panel is divided into a self-capacitance or a mutual capacitance touch screen panel, wherein the self-capacitance touch screen panel use the theory of self-capacitance to achieve of detecting the finger touching site. More specifically, a plurality of the touch sensors that is insulated to each other is formed in one layer in the touch screen panel. When a person don't touch the panel, the capacity to endure of each of the touch sensors are a fix value, when a person touch the panel, the capacity to endure of the touch sensor corresponding to the touch site is the fix value and the body capacitance, and the touch detection chip can detect the touch site by detecting the difference of the capacitance value of each of the touch sensors in the touch period. Wherein in order to achieve the function of the display and the touch in the same time, for the in cell touch screen panel, the touch circuit for touch function and the display circuit for the display function need to be drove, and achieve the touch function and the display function separately. In the exiting driving method, the touch scanning circuit and the display circuit is divided by time period, such as when the touch screen panel is drove; the detection of the touch on the touch screen panel is stopped.

Usually, the adoption of the in cell touch screen panel in the mobile device field, a plurality of the new touch function had been released, for example, in the standby mode of the mobile device, the mobile device can be wake up and into a specific application by a specific gesture (for example a double click gesture), in this case, the touch circuit need to be scanned continuously to detect the wake up gesture. Therefore, for the self-capacitance in cell touch screen panel, the touch detection chip need to be detected in the touch period. Since the touch sensor can be a common electrode (Vcom), and will couple to the source electrode of the thin film transistor by the storage capacity, no matter the square wave or the sine wave, it will make the electric charge coupling to the source electrode of the thin film transistor become the same electric charge of the polarity, as illustrated in FIG. 2. If the mobile device was in the standby mode with the black panel in a long time that is the liquid crystal molecule in the same electric charge in a long time, the liquid crystal will be polarized and make the abnormal display of the panel.

Therefore, the in cell touch screen panel now cannot make the terminal liquid crystal panel with the standby mode in a long time not to be polarized.

SUMMARY OF THE INVENTION

Accordingly, the purpose of this invention is to provide a full-in-cell touch screen panel and a mobile device with the full-in-cell touch screen panel. The polarized problem of the liquid crystal display panel in a long standby mode period is overcome by improving the structure of the full-in-cell touch screen panel.

According to the embodiment of this invention, a full-in-cell touch screen panel is provided, which includes a plurality of sensor pads arranged in a matrix, a plurality of date lines arranged along a row direction of the matrix, a data driving device connected to the data lines; and a plurality of transistors formed on the data lines, wherein each transistor of the plurality of transistors is formed in each of the data lines, a drain electrode of each transistor is connected to the corresponding data line, all gate electrodes of all of the plurality of transistors are all connected to a specific enable terminal of the data driving device.

In a preferred embodiment, a source electrode of each of the transistors is connected to a last one of the sensor pads in a row of the sensors pads adjacent to the corresponding data line.

In a preferred embodiment, the source electrode of each of the transistors is connected to each of the sensor pads.

In a preferred embodiment, the plurality of the sensor pads and a common electrode are in multiple operation by time divisions, wherein in a normal display period of the liquid crystal display panel, the plurality of sensor pads are operated as the common electrode; in the touch scanning period, the plurality of sensor pads are operated for touch scanning.

In a preferred embodiment, the full-in-cell touch screen panel further comprising the liquid crystal display panel integrated with the full-in-cell touch screen panel, a gate driving device for driving the liquid crystal display panel, and a plurality of gate lines to transmit the gate driving signal to the liquid crystal panel, wherein the plurality of data lines are connected to the liquid crystal display panel to transmit the data signal of the data driving device to the liquid crystal display panel.

In a preferred embodiment, a plurality of frames are included in a standby mode of the liquid crystal display panel, each frame has a predetermined touch scanning period, the plurality of sensor pads operate for touch scanning in the predetermined touch scanning period in each frame, wherein in a period from the Mth frame to the Nth frame, the specific enable terminal of the data driving device inputs a low electrical level signal and the gate driving device does not input a gate driving signal, and, in the clean screen period of the N+1th frame period after the touch scanning period of the N+1th frame period, the specific enable terminal of the data driving device inputs a high electrical level signal, the gate driving device inputs a gate driving signal to each of the plurality of gate lines accordingly, and the plurality of sensor pads are operated as the common electrode, wherein M and N are integers and N is larger than M.

In a preferred embodiment, the electrical level of the common electrode is a ground electrical level in the clean screen period.

According to the embodiment of this invention, a mobile device having a full-in-cell touch screen panel is provided.

According to the embodiment of this invention, a full-in-cell touch screen panel and a mobile device with the full-in-cell touch screen panel is provided by adding a plurality of transistors in the full-in-cell touch screen panel to achieve a novel full-in-cell touch screen panel, and the electric charge coupled to the liquid crystal in the touch scanning period can be effectively released, so that polarization of liquid crystal and occurrence of abnormal display of the panel could be prevented.

BRIEF DESCRIPTION OF THE DRAWINGS

The following detailed descriptions accompanying drawings and the embodiment of the present invention make the aspect of the present invention and the other beneficial effect more obvious.

DETAILED DESCRIPTION OF THE PREFERRED EMBODIMENTS

The specific components or items are used in the specification and claims. Those skilled in the art can use other possible modifications and variations in the same components or items. The specification and claim will not distinguish the different terms to the items or components but by the functions. Following is the detail description illustrated by the figures and the embodiments.

Figure 3:
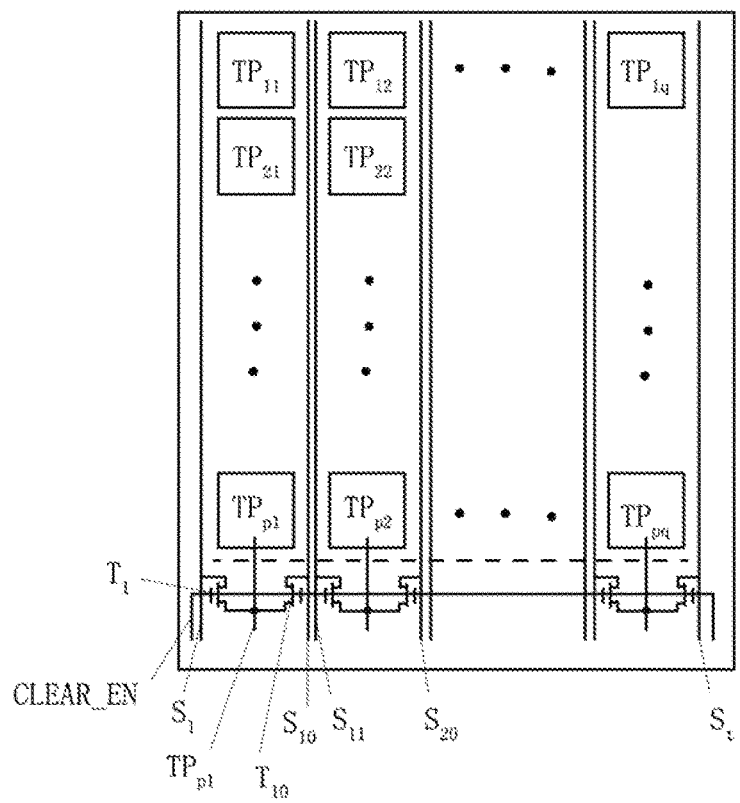
FIG. 3 is a schematic view illustrating a full-in-cell touch screen panel according to the embodiment of the present invention.

FIG. 3 is a schematic view illustrating a full-in-cell touch screen panel according to the embodiment of the present invention.

As illustrated in FIG. 3, the full-in-cell touch screen panel according to the embodiment of the present invention includes a plurality of sensor pads $TP_{pq}$ (p and q are integers and not smaller than 1) arranged in a matrix, a plurality of date lines $S_t$ (t is an integer and not smaller than 1) arranged along the row direction of the matrix, a data driving device (not shown in FIG. 3) connected to the data lines $S_t$, and a plurality of transistors $T_a$ (a is an integer and not smaller than 1) formed on the data lines, wherein each data line is formed with one of the transistors, the drain electrode of each transistor is connected to the corresponding data line, the source electrode of each transistor is connected to one of the sensor pads and the gate electrodes of all of the plurality of transistors are all connected to the specific enable terminal CLEAR-EN of the data driving device. Take an example here, the transistors can be field-effect transistors (for examples, NMOS transistors). It should be noted that, the embodiments below will be illustrated as taking NMOS transistors as examples.

Here, since all of the sensor pads in the full-in-cell touch screen panel can receive and output signal in the same time, and are connected to the ground level after a touch scanning period, there are a plurality of connecting ways to connect the source electrode of each of the transistors to each of the sensor pads. For example, the source electrode of each of the transistors is connected to the last one of the sensor pads in a row of the sensors pads adjacent to the corresponding data line. For example, referring to FIG. 3, the source electrodes of the transistors $T_1$-$T_{10}$ corresponding to the date lines $S_1$-$S_{10}$ are all connected to the sensor pad $TP_{p1}$ in the adjacent first row of sensor pads. By this way, the internal layout of the full-in-cell touch screen panel can be more standardized, and the manufacturing cost is saved. Besides, as another example, the source electrode of each of the transistors can be connected to any one of the sensor pads.

Besides, since the full-in-cell touch screen panel is to embed the touch circuit into the liquid crystal display panel to achieve the integration of the touch circuit and the liquid crystal display panel, the liquid crystal display panel in the end product is usually an integrated display panel with the function of touch and display.

Figure 1:
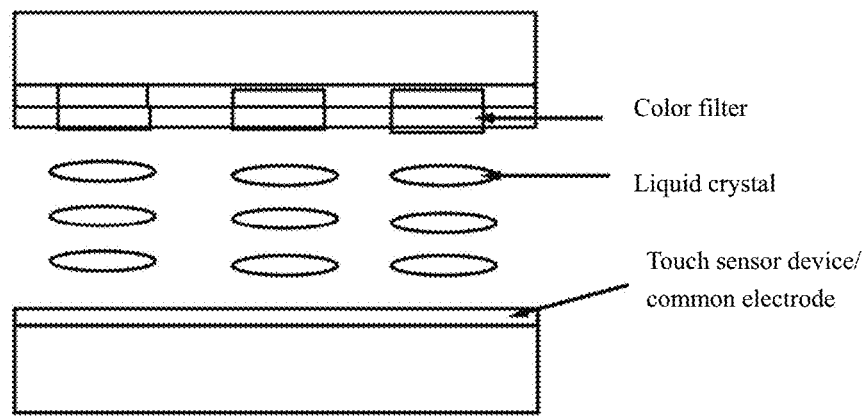
FIG. 1 is a cross-sectional view illustrating a full-in-cell touch screen panel of the conventional technology.
Figure 2:
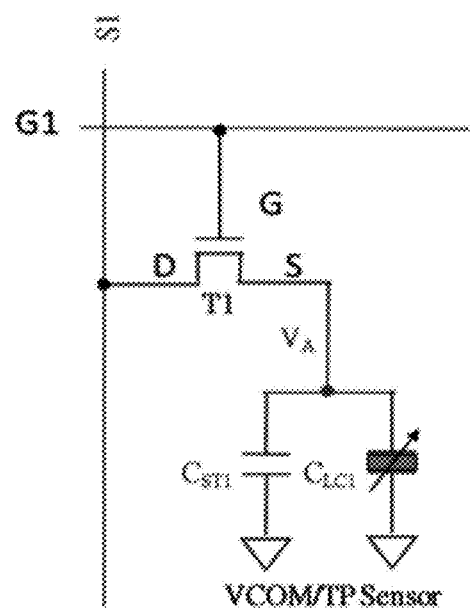
FIG. 2 is a circuit diagram of a display circuit in the full-in-cell touch screen panel of the conventional technology.

Here, as a component parts, the full-in-cell touch screen panel can further include a liquid crystal display panel integrated into the full-in-cell touch screen panel, a gate driving device for driving the liquid crystal display panel, and a plurality of gate lines (not shown in FIG. 1) that transmit the gate driving signal to the liquid crystal display panel, wherein the plurality of data lines are connected to the liquid crystal display panel to transmit the data signal of the data driving device to the liquid crystal display panel.

As an embodiment in this invention, in order to achieve the touch testing function and the display function in the full-in-cell touch screen panel, performing the multiple operations by time division of the sensor pad and the common electrode in the full-in-cell touch screen panel is adopted. For example, in the time period of the normal display of the integrated liquid crystal display panel with the full-in-cell touch screen panel, the plurality of sensor pads are operated as a common electrode; and, in the touch scanning period, the plurality of sensor pads are operated for touch scanning.

Figure 4:
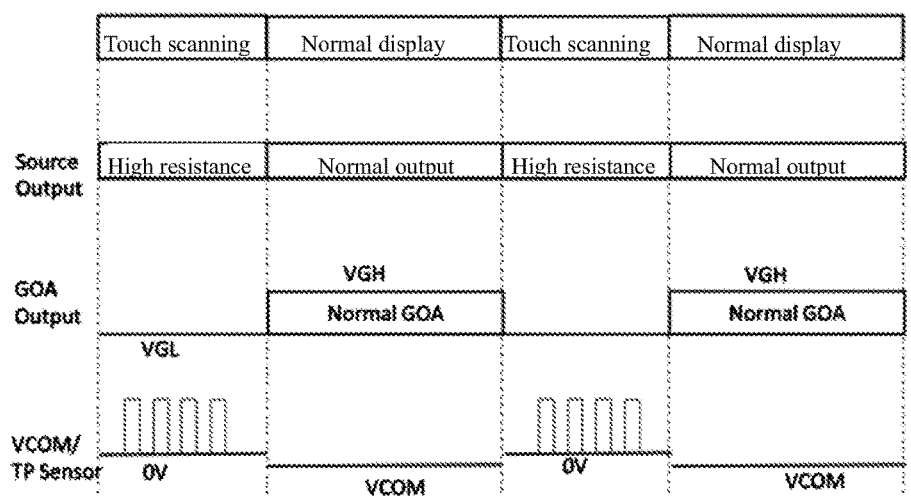
FIG. 4 is a timing diagram of the full-in-cell touch screen panel in a normal display mode according to the embodiment of the present invention.

FIG. 4 is a timing diagram of the full-in-cell touch screen panel in a normal display mode according to the embodiment of the present invention. As illustrated in FIG. 4, a plurality of frames are included in a normal display period of the liquid crystal display panel, each frame has a predetermined touch scanning period and normal display period. Referring to FIG. 4, during the normal display period of the liquid crystal display panel, the plurality of sensor pads are operated as a common electrode; and, in the touch scanning period, the plurality of the sensor pads is operated for touch scanning.

Besides operating for touch scanning in the normal display period of the full-in-cell touch screen panel, when the liquid crystal display panel is in the standby period in the dark mode, touch scanning is still needed to detect whether a touch operation is made to the full-in-cell touch screen panel by the user.

Figure 5:
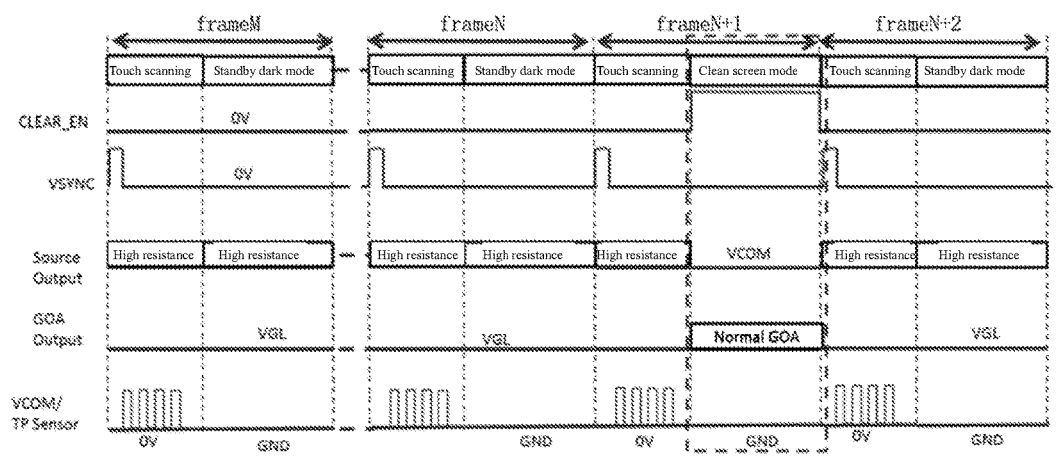
FIG. 5 is a timing diagram of the full-in-cell touch screen panel in a standby mode according to the embodiment of the present invention.

In the following, the full-in-cell touch screen panel in a standby mode according to the embodiment of the present invention is described with FIG. 5. Specifically, as illustrated in FIG. 5, a plurality of frames are included in a standby mode of the liquid crystal display panel, each frame has a predetermined touch scanning period, the plurality of sensor pads operate for touch scanning in the predetermined touch scanning period in each frame. (Refereeing to FIG. 5, during the touch scanning period, a pulsed signal is produced by the user touch.) More specifically, in a period from the Mth frame to the Nth frame, the specific enable terminal CLEAR-EN of the data driving device inputs a low electrical level signal, the gate driving device will not input a gate driving signal. In this time, the data line is in a high resistance. Besides, in each frame of the predetermined touch scanning period from the Mth frame to the Nth frame, the plurality of sensor pads are operated for touch scanning in each frame of the standby dark mode period from the Mth frame to the Nth frame, the plurality of sensor pads are operated as a common electrode and the electrical level of the common electrode becomes a ground electrical level. After that, in the N+1th frame period, the specific enable terminal CLEAR-EN of the data driving device inputs a high electrical level signal, the gate driving device inputs a gate driving signal to each of the plurality of gate line accordingly and the plurality of sensor pads are operated as a common electrode during the clean screen period after the predetermined touch scanning period in which touch scanning is performed. Here, as an embodiment, the electrical level of the common electrode is a ground electrical level.

In other words, in the clean screen period, the specific enable terminal of the data driving device outputs a high electrical level signal, therefore, take NMOS transistor as an example, each of the NMOS transistor is open according to the high electrical level signal received from the gate electrode. This makes the plurality of data lines to be connected with the plurality of sensor pads. Because the plurality of sensor pads are operated as a common electrode during the clean screen period, the electric charge coupled to the liquid crystal is cleaned during the predetermined touch scanning period, and the polarization of the liquid crystal is prevented and the power consumption of the data driving device is reduced in the meantime.

Besides, based on the same invention concept, the embodiments of this invention further provide a mobile device having the full-in-cell touch screen panel described above. For an embodiment, the mobile device can be a cell phone, a tablet, a TV, a display, a notebook, a navigation device or other product or component with a display function.

In summary, in the full-in-cell touch screen panel and the mobile device with the full-in-cell touch screen panel described above, a novel full-in-cell touch screen panel can be achieved by adding a plurality of transistors embedded in the full-in-cell touch screen panel. The electric charge coupled to the liquid crystal in the touch scanning period can be released, and the polarization of the liquid crystal and occurrence of the abnormal display of the liquid crystal display panel could be prevented.

It will be apparent to those having ordinary skill in the art that various modifications and variations can be made to the devices in accordance with the present disclosure without departing from the scope or spirit of the disclosure. In view of the foregoing, it is intended that the present disclosure covers modifications and variations of this disclosure provided they fall within the scope of the following claims and their equivalents.

Although the drawings and the illustrations above are corresponding to the specific embodiments individually, the element, the practicing method, the designing principle, and the technical theory can be referred, exchanged, incorporated, collocated, coordinated except they are conflicted, incompatible, or hard to be put into practice together.

Although the present application has been explained above, it is not the limitation of the range, the sequence in practice, the material in practice, or the method in practice. Any modification or decoration for present application is not detached from the spirit and the range of such.

What is claimed is:

1. A full-in-cell touch screen panel comprising: a plurality of sensor pads arranged in a matrix; a plurality of data lines arranged along a row direction of the matrix; a data driving device connected to the plurality of data lines; and a plurality of transistors formed on the plurality of data lines, wherein each transistor of the plurality of the transistors is formed in each of the plurality of data lines, a drain electrode of each of the plurality of transistors is connected to a corresponding one of the plurality of data lines, all gate electrodes of all of the plurality of transistors are connected to a specific enable terminal of the data driving device, wherein the full-in-cell touch screen panel further comprises a liquid crystal display panel integrated with the full-in-cell touch screen panel, a gate driving device for driving the liquid crystal display panel, and a plurality of gate lines to transmit a gate driving signal to the liquid crystal display panel, wherein the plurality of data lines are connected to the liquid crystal display panel to transmit a data signal of the data driving device to the liquid crystal display panel, wherein a plurality of frames are included in a standby mode of the liquid crystal display panel, each frame of the plurality of frames has a predetermined touch scanning period, and the plurality of sensor pads operate for touch scanning in the predetermined touch scanning period in each frame;

wherein, in a period from a Mth frame to a Nth frame, the specific enable terminal of the data driving device inputs a low electrical level signal and the gate driving device does not input the gate driving signal, and, in a clean screen period in a N+1th frame after the predetermined touch scanning period in the N+1th frame, the specific enable terminal of the data driving device inputs a high electrical level signal, the gate driving device inputs the gate driving signal to each of the plurality of gate lines accordingly, and the plurality of sensor pads is operated as a common electrode, wherein the M and N are integers and N is larger than M.

2. The full-in-cell touch screen panel according to claim 1, wherein a source electrode of each of the plurality of transistors is connected to a last one sensor pad of the sensor pads in a row of sensor pads of the plurality of sensors pads adjacent to a corresponding one of the plurality of data lines.

3. The full-in-cell touch screen panel according to claim 1, wherein a source electrode of each of the plurality of transistors is connected to each of the plurality of sensor pads.

4. The full-in-cell touch screen panel according to claim 1, wherein the plurality of sensor pads and the common electrode are in multiple operation by time divisions, wherein in a normal display period of the liquid crystal display panel, the plurality of sensor pads are operated as the common electrode; in the predetermined touch scanning period, the plurality of sensor pads are operated for touch scanning.

5. The full-in-cell touch screen panel according to claim 1, wherein an electrical level of the common electrode is a ground electrical level in the clean screen period.

6. A mobile device, wherein the mobile device having a full-in-cell touch screen panel, and the full-in-cell touch screen panel comprising: a plurality of sensor pads arranged in a matrix; a plurality of data lines arranged along a row direction of the matrix; a data driving device connected to the plurality of data lines; and a plurality of transistors formed on the plurality of data lines, wherein each transistor of the plurality of the transistors is formed in each of the plurality of data lines, a drain electrode of each of the plurality of transistors is connected to a corresponding one of the plurality of data lines, all gate electrodes of all of the plurality of transistors are connected to a specific enable terminal of the data driving device, wherein the full-in-cell touch screen panel further comprises a liquid crystal display panel integrated with the full-in-cell touch screen panel, a gate driving device for driving the liquid crystal display panel, and a plurality of gate lines to transmit a gate driving signal to the liquid crystal display panel, wherein the plurality of data lines are connected to the liquid crystal display panel to transmit a data signal of the data driving device to the liquid crystal display panel, wherein a plurality of frames are included in a standby mode of the liquid crystal display panel, each frame of the plurality of frames has a predetermined touch scanning period, and the plurality of sensor pads operate for touch scanning in the predetermined touch scanning period in each frame;

wherein, in a period from a Mth frame to a Nth frame, the specific enable terminal of the data driving device inputs a low electrical level signal and the gate driving device does not input the gate driving signal, and, in a clean screen period in a N+1th frame after the predetermined touch scanning period in the N+1th frame, the specific enable terminal of the data driving device inputs a high electrical level signal, the gate driving device inputs the gate driving signal to each of the plurality of gate lines accordingly, and the plurality of sensor pads is operated as a common electrode, wherein the M and N are integers and N is larger than M.

* * * * *